(12) United States Patent
Shen et al.

(10) Patent No.: US 12,528,739 B2
(45) Date of Patent: Jan. 20, 2026

(54) METHOD FOR SEQUESTERING CO2 FROM FLUE GAS AND PREPARING MICROFIBER-REINFORCED CEMENT

(71) Applicant: THE HONG KONG POLYTECHNIC UNIVERSITY, Hong Kong (CN)

(72) Inventors: Peiliang Shen, Hong Kong (CN); Jianxin Lu, Hong Kong (CN); Dongxing Xuan, Hong Kong (CN); Chi-Sun Poon, Hong Kong (CN)

(73) Assignee: THE HONG KONG POLYTECHNIC UNIVERSITY, Hong Kong (CN)

( * ) Notice: Subject to any disclaimer, the term of this patent is extended or adjusted under 35 U.S.C. 154(b) by 565 days.

(21) Appl. No.: 18/060,992

(22) Filed: Dec. 2, 2022

(65) Prior Publication Data

US 2023/0174424 A1 Jun. 8, 2023

(51) Int. Cl.
| | | |
|---|---|---|
| *C04B 7/36* | (2006.01) | |
| *C04B 7/48* | (2006.01) | |
| *C04B 14/28* | (2006.01) | |
| *C04B 14/46* | (2006.01) | |
| *C04B 18/08* | (2006.01) | |
| *C04B 28/14* | (2006.01) | |

(52) U.S. Cl.
CPC ............... *C04B 7/367* (2013.01); *C04B 7/48* (2013.01); *C04B 14/28* (2013.01); *C04B 14/46* (2013.01); *C04B 18/08* (2013.01); *C04B 28/14* (2013.01)

(58) Field of Classification Search
CPC ........... C04B 7/367; C04B 7/48; C04B 14/28; C04B 14/46; C04B 18/08; C04B 28/14; C04B 20/006; C04B 20/023; C04B 28/02; C04B 7/527; C04B 22/10; Y02P 40/18
See application file for complete search history.

(56) References Cited

FOREIGN PATENT DOCUMENTS

| CN | 110734255 A | 1/2020 |
| CN | 113213498 A | 8/2021 |

OTHER PUBLICATIONS

Machine Translation of China Patent Specification No. CN 113213498 A. (Year: 2021).*
Office Action of CN 2021114722412 issued from the China National Intellectual Property Administration (CNIPA) on May 24, 2024.

\* cited by examiner

*Primary Examiner* — Anthony J Green
(74) *Attorney, Agent, or Firm* — S&F/WEHRW

(57) ABSTRACT

A method for sequestating carbon dioxide from flue gas by using a cement clinker. The products of this method can also be used to prepare microfiber-reinforced cement. The method of the present disclosure is capable of capturing and storing carbon dioxide in flue gas, such as cement kiln flue gas.

18 Claims, 3 Drawing Sheets

METHOD FOR SEQUESTERING CO2 FROM FLUE GAS AND PREPARING MICROFIBER-REINFORCED CEMENT

CROSS-REFERENCE TO RELATED APPLICATIONS

This application claims priority from China Patent Application No. 202111472241.2, filed on Dec. 3, 2021, which is incorporated herein by reference in its entirety.

TECHNICAL FIELD

The present disclosure relates to a method for capturing and storing carbon dioxide from flue gas, such as cement kiln flue gas, and to microfiber-reinforced cement prepared therefrom.

BACKGROUND

With the emission of greenhouse gases, which causes global warming and seriously affects the survival and development of human beings, it has become an important consensus in the international community to reduce greenhouse gas emission, especially carbon dioxide emission. Based on the above, China proposed the strategy of carbon peaking and carbon neutrality in 2020 and strives to achieve carbon neutrality by 2060. However, achieving this goals presents systemic challenges mainly related to energy, and affects all sectors of the national economy. According to statistics, China's annual carbon dioxide emissions reach more than 10 billion tons annually, accounting for around 28% of the total world emissions, of which the cement industry, as the second largest carbon dioxide emitting industry, emits 1.23 billion tons annually, accounting for about 84.3% of the building materials industry emissions and about 13.5% of China's total emissions. Due to the necessitated construction activities, cement will act as an important building material in the future. As a large amount of carbon dioxide emission is due to the decomposition of limestone during the cement clinking process, it is difficult to achieve carbon neutrality only by improving efficiency and changing energy structures. As a result, it is difficult to meet the urgent need for low-carbon development in the cement industry. Carbon dioxide storage and utilization technology in the cement industry is relevant for achieving the goal of carbon peaking and carbon neutrality.

Carbon dioxide capture, utilization and storage (CCS) technology, which is expected to achieve net-zero emission from fossil energy utilization, is gradually gaining attention in the world. At present, the commonly used CCS technologies mainly include deep saline layer storage, geological storage ($CO_2$-enhanced oil recovery and $CO_2$-enhanced coalbed methane recovery), and chemical method capture before and after combustion, etc. By the end of 2019, nine capture demonstration projects and 12 geological utilization and storage projects have been established in China, and the accumulated carbon dioxide storage volume is about 2 million tons. However, due to the steps required for capture, transportation, utilization and storage, CCS possesses high energy consumption and cost. The cost of $CO_2$ capture alone can be as high as 300-900 RMB/ton, which seriously limits the promotion and application of capture technologies. Meanwhile, according to the Special Report on Global Warming of 1.5° C. (2018), CCS is required to achieve 348 billion tons of emission reductions by 2100 in four scenarios of achieving a controlled temperature rise of no more than 1.5° C. It is proposed According to the Special Report on Climate Change and Land (2019) that CCS emission reduction potential by 2050 should be 11.3 billion tons/year.

Many chemical reactions are known to be reversible processes. Portland cement contains $C_3S$ ($Ca_3SiO_5$), $C_{2S}$ ($Ca_2SiO_4$), $C_3A$ ($Ca_3Al_2O_6$), $C_4AF$ ($Ca_4Al_2Fe_2O_{10}$), etc. as the main chemical components, which can be reacted with $CO_2$, $SO_2$ and NO in an acidic gas environment, converting to raw material components prior to the processing or extraction process, such as calcium carbonate, silica, gypsum, etc. Calcium and silica in these solid wastes are often derived from calcium carbonate and quartz sand and can be reverted to calcium carbonate and silica by carbonation. According to statistics, China's annual cement production is 2.358 billion tons, and the annual $CO_2$ emissions from the cement industry can reach 1.23 billion tons. The main sources of carbon emission from the cement industry are production electricity consumption, fuel combustion and decomposition of raw materials containing carbonate. The $CO_2$ comparable emission of cement is about 675 kg/t, as calculated according to advanced value of the current national standard, viz, The Norm of Energy Consumption per Unit throughput of Cement Products, wherein, the indirect $CO_2$ emission from production electricity consumption accounts for 10.82%, the direct $CO_2$ emission from fuel combustion accounts for 31.45%, and the direct $CO_2$ emission from raw material carbonate decomposition accounts for 57.73%. As for the main sources of $CO_2$ emission in cement industry, a lot of research has been carried out, mainly including enhancement of energy efficiency, utilization of low carbon emission fuels and low carbonate raw materials, etc. At present, China's cement production technology is at the advanced level, and there is not much potential to reduce $CO_2$ emission from cement by reducing the comprehensive energy consumption of cement. Although it is an important option to use calcium alternative raw materials to reduce $CO_2$ emissions from decomposition of raw material carbonate, the blending amount of the current commonly used calcium carbide slag, blast furnace slag, steel slag or fly ash is limited, furthermore, calcium alternative raw materials have some questions, such as insufficient sources, unstable composition etc., which could generate potential bottlenecks in longterm production. It is the most effective technical path for carbon emission reduction to develop low-cost $CO_2$ capture, utilization and storage technologies for cement industry by making full use of the characteristics of cement clinker, which has high carbonation activity. Theoretically, cement clinker can sequester more $CO_2$ than that produced by carbonate decomposition, which is an important direction for the future low-carbon development of cement industry.

The current $CO_2$ capture, utilization and storage technologies for cement industry mainly include the use of calcium/magnesium cycle calcination, such as calcium carbonate and magnesium carbonate to capture and purify carbon dioxide, as well as ethanolamine absorption method and oxygen/$CO_2$ cycle combustion method (Chinese patent applications No. CN102233224A and CN110227337A). However, since the composition of cement kiln waste gas is complex, high-purity $CO_2$ can be obtained only by complex processes such as dust removal, purification and removal of harmful components the waste gas, rendering the production cost high, up to 1500-2000 RMB/ton, the technologies mainly find use in the fields of food, experiments, etc., and the demand for the technologies is limited. So, the technologies are still at the stage of small-scale demonstration production, and large-scale industrial production and promotion have not been achieved. In addition, Chinese patent application No. CN201910358573.4 discloses a method and device for curing cement concrete products with oxy-fuel combustion tail gas from cement kilns, in which the cement concrete products may be cured by passing the tail gas resulting from oxy-fuel combustion of cement kilns directly into the carbonation curing chamber. The method may improve the strength of the cement concrete products while realizing the capture and utilization of $CO_2$ from cement industry, but it has a slower rate.

There is thus a need to develop advanced methods and systems for capturing and utilizing carbon dioxide waste generated in the cement industry at low cost and in high efficiency.

SUMMARY

Provided herein is a method for storing $CO_2$ in flue gas, such as cement kiln flue gas, and a method of preparing microfiber-reinforced cement.

In a first aspect, provided herein is a method for sequestrating carbon dioxide from a flue gas, the method comprising: reacting the flue gas with a cement clinker thereby sequestering at least a portion of the carbon dioxide from the flue gas in the cement clinker.

In certain embodiments, the cement clinker is in the form of a powder.

In certain embodiments, the step of reacting the flue gas and the cement clinker takes place in the presence of at least one of a reaction accelerator and a surfactant.

In certain embodiments, the method further comprises the step of mixing the reaction accelerator, the surfactant, and the cement clinker in water thereby forming a solid-liquid suspension slurry.

In certain embodiments, the method further comprises the step of carrying out solid-liquid separation after the reaction between the flue gas and the solid-liquid suspension slurry thereby forming a solid and a liquid.

In certain embodiments, the method further comprises the step of drying the solid to obtain a separated fibrous solid comprising calcium carbonate microfibers.

In certain embodiments, the reaction accelerator comprises sodium ethylenediamine tetraacetate, polyvinyl alcohol, triethanolamine, or any combination thereof.

In certain embodiments, the surfactant comprises sodium carboxymethyl cellulose, amino acid phosphate, soluble magnesium salt, magnesium hydroxide, phosphoric acid, soluble phosphate, soluble aluminum salt, or any combination thereof.

In certain embodiments, the cement clinker is a Portland cement clinker.

In certain embodiments, the cement clinker comprises $Ca_3SiO_5$, $Ca_2SiO_4$, $Ca_3Al_2O_6$, and $Ca_4Al_2Fe_2O_{10}$.

In certain embodiments, the powder has at least one of an average particle size of less than 0.075 mm, or has a specific surface area of at least 200 $m^2/kg$.

In certain embodiments, the solid-liquid suspension slurry is prepared by mixing the cement clinker with an aqueous solution comprising the reaction accelerator and the surfactant.

In certain embodiments, the mass ratio of the cement clinker to the water in the solid-liquid suspension slurry is from 1:5 to 1:100.

In certain embodiments, the solid-liquid suspension slurry is at least one of heated to 45° C.-100° C. and exposed to a pressure of to 0-2 atmosphere.

In certain embodiments, the flue gas comprises decomposition furnace flue gas, rotary kiln flue gas, cyclone preheater flue gas, or oxy-fuel combustion flue gas.

In certain embodiments, the concentration of carbon dioxide in the flue gas is at least 5%; and the concentrations of NO and $SO_2$ are optionally not higher than 400 $mg/m^3$ and 200 $mg/m^3$, respectively.

In a second aspect, provided herein is a method for preparing a microfiber-reinforced cement, comprising mixing the separated fibrous solid described herein with gypsum and a mineral admixture comprising one or more of silica fume, fly ash, slag, metakaolin, and ground limestone powder.

In a third aspect, provided herein is a microfiber-reinforced cement prepared according to the method of the second aspect.

In certain embodiments, the microfiber-reinforced cement comprises the separated fibrous solid in an amount of 2-20% by weight of the microfiber-reinforced cement, the cement clinker in an amount of 50-90% by weight of the microfiber-reinforced cement, the gypsum in an amount of 1-3% by weight of the microfiber-reinforced cement, and the mineral admixture in an amount of 5-40% by weight of the microfiber-reinforced cement.

Desulfurization, denitrification, and reduction of emissions can be achieved by sequestering $CO_2$, $SO_2$ and NO in flue gas comprising a cement clinker, such as, e.g., cement kiln flue gas. The method described herein can make full use of the existing resources of cement plants, realize the resource utilization of carbonation products and produce high-performance microfiber-reinforced cement from the products generated therefrom, and thus has important environmental benefits and contributes to the successful achievement of carbon peaking and carbon neutrality goals.

The method described herein can involve the preparation of micron-sized calcium carbonate (e.g., aragonite) fiber by sequestering $CO_2$ with cement kiln products (cement clinker), and produce a highly reactive amorphous gel at the same time, thereby enhancing the mechanical properties and durability of the cement.

The method described herein is simple and low-cost, and can be used to synthesize microfibers and prepare microfiber-reinforced cement by adding a carbon dioxide sequestering system to the cement plant.

Cement clinkers have the ability to store at least 0.3 g $CO_2$ per g of the cement clinker. The prepared microfiber-reinforced cement has the property of lower carbon as compared to common cement, thereby reducing $CO_2$ emission by 8% to 75%; the microfiber-reinforced cement thus prepared is characterized by high strength and low shrinkage, and shows a reduction in drying shrinkage and autogenous shrinkage by 10% to 80%, an increase in flexural strength and compressive strength by up to 40%, and an increase in tensile strength, toughness and impact resistance by at least 10%, as compared to that of common Portland cement.

The microfiber-reinforced cement prepared according to the method described herein has excellent mechanical properties and shows a reduction in drying shrinkage and autogenous shrinkage by 10%-80%, an increase in tensile strength, toughness and impact resistance by at least 10%, and a maintenance or increase in flexural strength and compressive strength by up to 40%, as compared to normal concrete and products thereof composed of water, fine and coarse aggregates and prepared according to a conventional cement concrete design and method.

The method and device for carbon sequestration of the present disclosure are simple and can be used for carbon sequestration not only for cement kiln flue gas, but also for other enterprises that emit carbon dioxide.

BRIEF DESCRIPTION OF THE DRAWINGS

The above and other objects and features of the present disclosure will become apparent from the following description, when taken in conjunction with the accompanying drawings, in which:

As shown in FIG. 1, the device described herein optionally comprises a waste heat generation system 1, a low temperature flue gas separation apparatus or low temperature steam system 2 connected to the waste heat generation system 1, a plurality of carbonation reaction cells 3 connected to the low temperature flue gas separation apparatus 2, a plurality of precipitation separation cells 4 connected to the carbonation reaction cells, a blast drying apparatus 5 connected to the precipitation separation cells, a blending system apparatus 6 downstream of the blast drying apparatus, and eventually microfiber-reinforced cement 7 is obtained.

DETAILED DESCRIPTION

Figure 1:
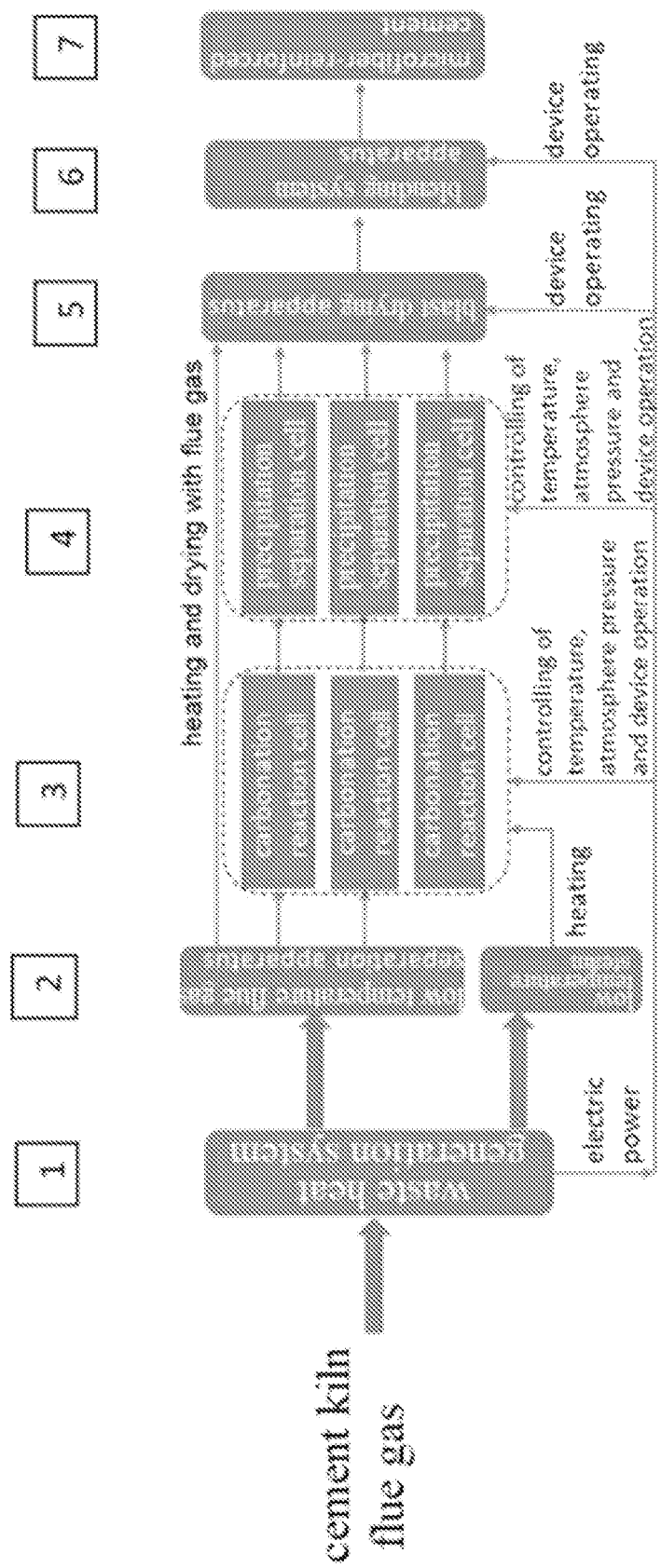
FIG. 1 is an exemplary process flow diagram in accordance with certain embodiments described herein.

Cement clinker is a semi-finished product obtained by preparing cement raw meal using limestone, clay and iron as the main raw materials in the appropriate proportions, calcining the cement raw meal until partially or completely melted, and cooling the cement raw meal. In the cement industry, the main chemical compositions of the most commonly used Portland cement clinker are calcium oxide, silicon dioxide and small amounts of alumina and iron oxide, and main mineral compositions are tricalcium silicate, dicalcium silicate, tricalcium aluminate and tetracalcium iron aluminate. The Portland cement clinker is finely ground together with appropriate amount of gypsum to form silicate cement.

Provided herein is a method for sequestrating carbon dioxide in flue gas, the method comprising: reacting the flue gas with a cement clinker. The flue gas may be any variety of carbon dioxide containing flue gas generated industrially or domestically. In certain embodiments, the flue gas is cement kiln flue gas, including, for example, one or more of decomposition furnace flue gas, rotary kiln flue gas, cyclone preheater flue gas, or oxy-fuel combustion flue gas.

In certain embodiments, the concentration of $CO_2$ in the flue gas from the cement kiln is at least 5% of the volume flue gas. In certain embodiments, the concentrations of NO and $SO_2$ in the flue gas of the cement kiln are not higher than 400 mg/m$^3$ and 200 mg/m$^3$, respectively. In certain embodiments, the temperature of the flue gas has been reduced by waste heat generation. In certain embodiments, the carbon dioxide-containing flue gas is produced from other industries, such as the petrochemical industry.

In certain embodiments, the cement clinker is in the form of a powder. The powder can have an average particle size of less than 0.075 mm and/or has a specific surface area of at least 200 m$^2$/kg. Cement clinker powder can be prepared by conventional grinding equipment in the art, such as roller mills and ball mills, and the electrical energy required for grinding may come from electric power manufactured by the waste heat generation system. The machine for cooling the cement clinker can be a grate cooler.

In certain embodiments, the reaction system composed of flue gas and cement clinker powder further comprises a reaction accelerator and/or a surfactant. The reaction accelerator, such as primary, secondary and tertiary amines, is commonly used in large scale $CO_2$ absorption applications. Both primary and secondary amines can accelerate the dissolution of calcium ions from cement clinker, increasing the kinetic rate of their carbon uptake. Reaction accelerators that may be used in the method described herein include, but are not limited to, sodium ethylenediamine tetraacetate, polyvinyl alcohol, triethanolamine, or any combination thereof.

A surfactant refers to a substance that causes a significant decrease in the surface tension of a target solution. The surfactant can have fixed hydrophilic and lipophilic groups that can be oriented on the surface of the solution. The molecular structure of the surfactant can be amphiphilic: hydrophilic groups at one end and hydrophobic groups at the other end. The hydrophilic groups are often polar groups, such as carboxylic acid, sulfonic acid, sulfuric acid, amino or amine groups and their salts, and hydroxyl groups, amide groups, ether bonds, etc. can also be used as polar hydrophilic groups. The hydrophobic groups are often non-polar hydrocarbon chains, such as hydrocarbon chains with more than 8 carbon atoms. Surfactants can be classified as ionic surfactants (including cationic surfactants and anionic surfactants), nonionic surfactants, amphoteric surfactants, complex surfactants, other surfactants, etc. Surfactants that can be used in the present invention preferably include sodium carboxymethyl cellulose, amino acid phosphate, soluble magnesium salt, magnesium hydroxide, phosphoric acid, soluble phosphate, soluble aluminum salt, or any combination thereof.

In certain embodiments, the reaction accelerator, the surfactant, and the cement clinker powder are mixed and prepared into a solid-liquid suspension slurry, wherein the solid-liquid suspension slurry may be obtained by mixing the cement clinker with an aqueous solution comprising a reaction accelerator and a surfactant in a carbonation reaction cell.

The carbonation reaction cell can be designed according to the actual production requirements without any special limits. In certain embodiments, the carbonation reaction cell comprises ducts to which the $CO_2$ in fume gas can be passed, a tail gas removal channels, a material inlet and a material outlet, a heating apparatus, a stirring device and a pressure regulating apparatus. The reaction system in the carbonation reaction cell can be easily transported to the solid-liquid separation cell connected to it.

The concentration of the reaction accelerator and surfactant in the solid-liquid suspension slurry may be adjusted according to the solid content of the solid-liquid suspension slurry. In certain embodiments, the reaction accelerator accounts for about 0.01%-2% of the mass of the aqueous solution, e.g., 0.02%-2%, 0.04%-2%, 0.08%-2%, 0.1%-2%, 0.2%-2%, 0.4%-2%, 1.0%-2%, 1.5%-2%, and other ranges. The molar concentration of the surfactant is in a range of 0.01-5 mol/L, e.g., 0.02-5, 0.04-5, 0.06-5, 0.08-5, 0.1-5, 0.2-5, 0.2-4, 0.2-3, 0.4-3 or 1-3 mol/L, etc.

In certain embodiments, the mass ratio of the cement clinker to the solution in the solid-liquid suspension slurry can be regulated according to actual situation, for example the range of the mass ratio can be from about 1:5 to 1:100, 1:6 to 1:100, 1:8 to 1:100, 1:10 to 1:100, 2:15 to 1:100, 3:20 to 1:100, 1:25 to 1:90, 1:30 to 1:80, etc.

In certain embodiments, the cement kiln flue gas after reduction of temperature is passed into the carbonation reaction cell from the bottom, and the temperature and pressure of the reaction cell are continuously controlled, so that the flue gas reacts fully with the suspension slurry in the reaction cell. The tail gas that does not participate in the reaction can be released from a gas aperture of the reaction cell.

In certain embodiments, the solid-liquid suspension slurry is heated to 45° C. to 100° C., such as 45° C.-90° C., 45° C.-80° C., 45° C.-70° C., 45° C.-60° C., 50° C., 55° C., 65° C., etc. The pressure in the carbonation reaction cell is adjusted to 0, 1 or 2 atmospheres, or any value from 0-2 atmospheres. The heating step can be carried out with the waste heat from the electric power generated by the waste heat generation system. In certain embodiments, the power supply for mixing the cement clinker with the solution can be obtained from the waste heat generation system.

The rate for introduction of the flue gas into the solid-liquid suspension slurry can be adjusted according to the solid content, temperature and pressure of the suspension slurry. In certain embodiments, the rate for introducing the flue gas is controlled to be in a range of 0.01 $CO_2$/min/g to 2 L $CO_2$/min/g, e.g., 0.02-2 L, 0.04-2 L, 0.08-2 L, 0.1-2 L, 0.2-2 L, 0.4-2 L, 0.8-2 L, 1-2 L, 1.2-2 L $CO_2$/min/g, as calculated in terms of pure carbon dioxide. The introduction time can be in a range of 30 min to 360 min, e.g., 40 min to 360 min, 50 min to 360 min, 60 min to 360 min, 70 min to 360 min, 80 min to 360 min, 100 min to 360 min, 1.5 h, 2 h, or 3 h. The introduction time can be readily determined by a person of ordinary skill in the art to ensure that the reaction proceeds adequately.

In certain embodiments, in the carbonation reaction cell, carbon dioxide in the flue gas is absorbed and sequestered by the solid-liquid suspension slurry to produce reaction products, such as calcium carbonate microfibers, silica gel, aluminum gel, and silica-aluminum gel. The solid-liquid suspension slurry also reacts with $SO_2$ and/or NOx in the flue gas to produce a reaction product comprising gypsum and/or calcium nitrate.

In certain embodiments, the method further comprises the step of carrying out solid-liquid separation by feeding the reaction system into a solid-liquid separation cell after the reaction between the flue gas and the solid-liquid suspension slurry. The solid-liquid separation cell should be designed to carry out easily the solid-liquid separation. Conventional solid-liquid separation methods, such as one or more of centrifugation, sedimentation and pressurized filtration, may be used. Optionally, the remaining liquid collected after the solid-liquid separation is recovered and reused to prepare another solid-liquid suspension slurry.

The method can also comprise drying solids obtained by solid-liquid separation to obtain a fibrous solid comprising calcium carbonate. In certain embodiments, the fibrous solid comprises needle-like solids. In certain embodiments, the fibrous solid comprises aragonite.

The drying process may be performed by conventional drying methods. In certain embodiments, the fibrous solids may be fed into a cyclone drying apparatus and dried using the cement kiln flue gas or the flue gas cooled by the waste heat generation, to obtain a material rich in calcium carbonate microfibers.

In certain embodiments, the method further comprises preparing and obtaining a microfiber-reinforced cement by mixing the fibrous solids with a cement clinker, gypsum and a mineral admixture, wherein the cement clinker may be silicate cement clinker. The mineral admixture may be one or more of silica fume, fly ash, slag, metakaolin, and finely ground limestone powder. Energy may be supplied by the waste heat generation to mix the materials thoroughly.

In the microfiber-reinforced cement prepared according to the method of the present invention, the microfibers have a mass content of more than 60%, e.g. more than 62%, 65%, 67%, 70%, 72%, 75%, 80%, based on the mass of the microfiber reinforced cement, a diameter of 0.2-2 μm, e.g. 0.3-2, 0.4-2, 0.6-2, 0.8-2, 1.0-2, 1.2-2 μm, and/or a length-diameter ratio of 5-30, such as 6-30, 8-30, 10-30, 10-25, 12-25, 15-30, or 6, 7, 8, 9, 10, 12, 14, 16, 18, 20, 22, 24, 25, 27, 28, etc.

The microfiber-reinforced cement can comprise the fibrous solids in an amount of 2-20% by weight of the microfiber-reinforced cement, the cement clinker in an amount of 50-90% by weight of the microfiber-reinforced cement, the gypsum in an amount of 1-3% by weight of the microfiber-reinforced cement, and the mineral admixture in an amount of 5-40% by weight of the microfiber-reinforced cement.

After calculation with whole life cycle carbon footprint and test according to the methods of the national standards GB/T 17671-2020, GBT29417-2012, GB/T50081-2002 and ACI 544-2R-89, the microfiber-reinforced cement described herein shows a reduction in drying shrinkage and autogenous shrinkage 10%-80%, and an increase in flexural strength and compressive strength by up to 40%, and/or an increase in tensile strength, toughness and impact resistance by at least 10%, compared to common Portland cement. The methods of the national standards GB/T 17671-2020, GBT29417-2012, GB/T50081-2002 and ACI 544-2R-89 are well known in the art.

The microfiber-reinforced cement described herein can be used in construction projects in various industries, such as high-speed railway projects, marine projects, underground projects or road projects.

The device of the present invention is shown in FIG. 1, wherein the solid-liquid suspension slurry can be prepared by mixing the cement clinker powder with an aqueous solution, and adding the reaction accelerator and the surfactant, then the slurry is fed into the carbonation reaction cell 3 and stirred thoroughly, followed by heating and regulation. The cement kiln waste gas is optionally used to generate electric power by the waste heat generation system 1, and the electric power thus generated can be used in the various steps of the method of the present invention. The flue gas after power generation enters the low temperature flue gas separation apparatus or low temperature steam system 2, and the cement kiln flue gas after reduction of temperature is passed into the carbonation reaction cell 3 from the bottom, where the temperature and pressure are continuously controlled, to react with the suspension slurry in the reaction cell, wherein the tail gas that does not participate in the reaction is removed from the gas aperture of the reaction cell. The solid-liquid suspension slurry obtained in reaction cell 3 is fed into the precipitation separation cell 4 for solid-liquid separation. Optionally, the remaining liquid in the precipitation separation cell 4 is recycled and reused to prepare the suspension slurry. The fibrous solids obtained in the precipitation separation cell 4 are fed into the drying apparatus 5 and heated and dried using the cement kiln flue gas. The dried fibrous solids are fed into and mixed in the blending system apparatus 6, together with a cement clinker, gypsum and a mineral admixture, to prepare the microfiber-reinforced cement 7.

The present disclosure provides a method for capturing carbon dioxide in flue gas from cement kilns and preparing microfiber-reinforced cement, wherein, the cement clinker has an ability to store at least 0.3 g $CO_2$ per g of the cement clinker; the microfiber-reinforced cement thus prepared has the property of lower carbon as compared to common cement, thereby reducing $CO_2$ emission by 8% to 75%. The microfiber-reinforced cement thus prepared is characterized by high strength and low shrinkage, and shows a reduction in drying shrinkage and autogenous shrinkage by 10% to 80%, an increase in flexural strength and compressive strength by up to 40%, and an increase in tensile strength, toughness and impact resistance by at least 10%, as compared to common silicate concrete.

Also provided herein is a microfiber-reinforced concrete or precast concrete comprising the microfiber-reinforced cement. The microfiber-reinforced concrete or precast concrete may be formed by mixing the microfiber-reinforced cement described herein with water and fine and coarse aggregates. The microfiber-reinforced concrete or precast concrete have one or more of the following properties as compared to cement concrete prepared according to a conventional cement concrete design and method: improved mechanical property; reduced shrinkage property; reduction in drying shrinkage and autogenous shrinkage by 10% to 80%; increase in tensile strength, toughness and/or impact resistance by at least 10%; and maintenance or increase in flexural strength and/or compressive strength by up to 40%. In some embodiments, the prepared microfiber-reinforced concrete and precast concrete thereof can be used in, but are not limited to, various types of large-scale projects, such as high-speed railway projects, marine projects, underground projects, road projects, etc.

Example 1

Figure 2:
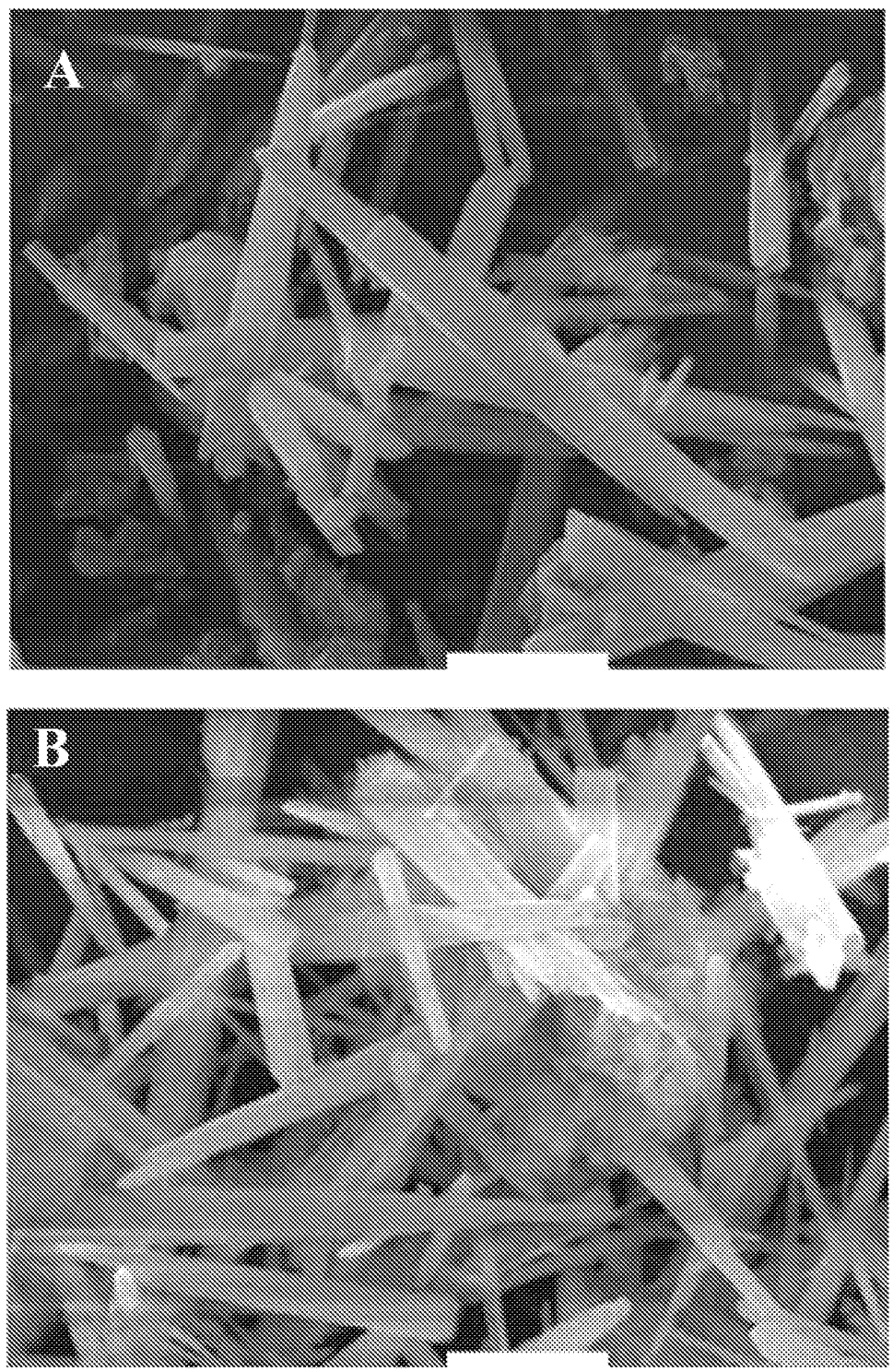
FIG. 2 shows scanning electron microscopy (SEM) images of the calcium carbonate microfibers prepared in the examples. (A), (B), and (C) SEM images of calcium carbonate microfibers prepared in Examples 1, 2 and 3, respectively. Scale shown is 5 μm.
Figure 2:
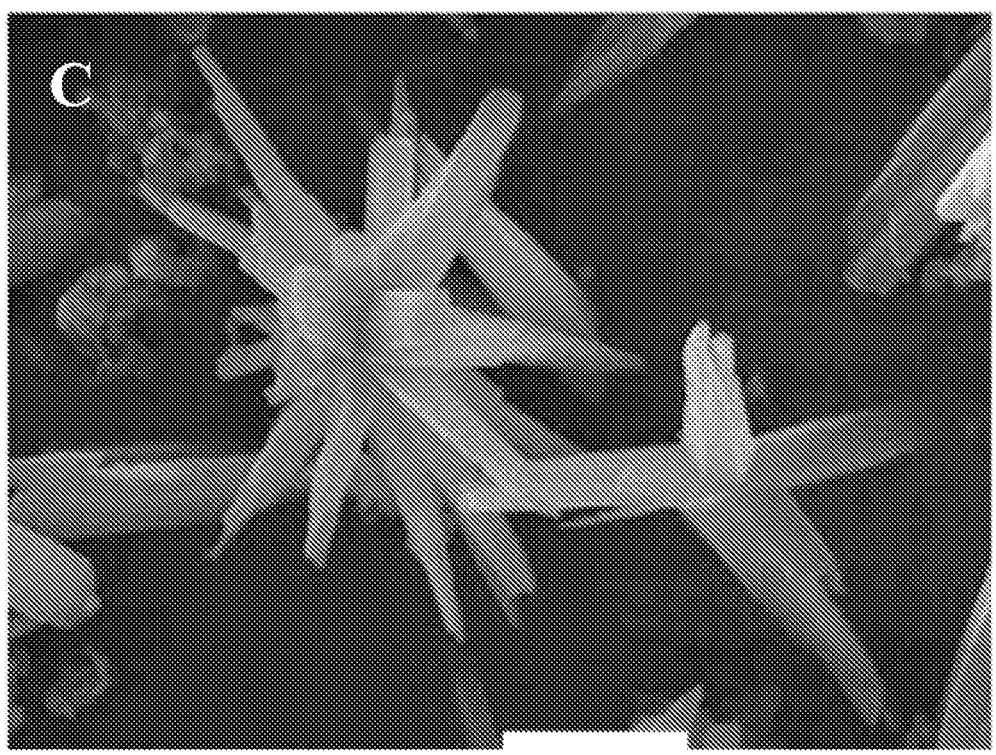

First, cement clinker was ground into powder (<0.075 mm) to a specific surface area of 480 m²/kg and mixed thoroughly with an aqeuous solution in the carbonation reaction cell at a solid-to-liquid mass ratio of 1:10. The solution used was composed of 0.5% mass fraction of the reaction accelerator triethanolamine and 0.05 mol/L of the surfactant sodium carboxymethyl cellulose. After stirring, the suspension slurry was heated to 80° C., then the cement kiln flue gas cooled by the waste heat generation system was introduced into the suspension slurry, wherein the concentration of carbon dioxide in the flue gas accounted for 15% VOL of the total flue gas, the rate for introduction was controlled to be 0.5 L $CO_2$/min/g, as calculated according to the pure carbon dioxide, the pressure was controlled to be 1 atmosphere pressure. After introduction for 60 min, the solid-liquid suspension slurry was transferred to precipitation the separation cell, to quickly obtain solid products using the centrifugal method, and then the solid products were fed into the cyclone drying apparatus for quick drying to obtain micron-sized calcium carbonate-rich fibers. The X-ray diffraction analysis and scanning electron microscopy were used to determine the proportion and morphological characteristics of the calcium carbonate microfibers (FIG. 2A), the main indexes of which are shown in Table 1. Then the calcium carbonate microfibers were fed into the blender at 10% wt/wt, and mixed with 70% wt/wt cement clinker, 2% wt/wt gypsum and 18% wt/wt fly ash to prepare the microfiber-reinforced cement. The carbon dioxide storage capacity of the microfiber-reinforced cement was calculated to be 0.41 g $CO_2$/g cement clinker. The prepared microfiber-reinforced cement shows a reduction in $CO_2$ emission by 34.1%, an increase in compressive strength by 15.0%, an increase in flexural strength by 22.5%, a reduction in drying shrinkage by 35.6%, an increase in tensile strength by 16.7%, and an increase in toughness by 21.0%, after calculation with the whole life cycle carbon footprint and test according to the methods of the national standards GB/T 17671-2020, GBT29417-2012, GB/T50081-2002 and ACI 544-2R-89, as compared to PI 52.5 common silicate cement produced by Green Island Cement Co., Ltd. in Hong Kong.

Example 2

First, cement clinker was ground into powder (<0.075 mm) to a specific surface area of 612 m²/kg and mixed thoroughly with an aqeuous solution in the reaction cell at a solid-to-liquid mass ratio of 1:50. The solution used was composed of 0.03% mass fraction of the reaction accelerator sodium ethylenediamine tetraacetate and 0.2 mol/L of the surfactant magnesium nitrate. After stirring, the suspension slurry after stirring was heated to 60° C., then the cement kiln flue gas cooled by the waste heat generation system was introduced into the suspension slurry, wherein the concentration of carbon dioxide in the flue gas was 9% VOL of the total flue gas, the rate for introduction was controlled to be 0.05 L $CO_2$/min/g, as calculated according to the pure carbon dioxide, the pressure was controlled to be 2 atmospheres pressure. After introduction for 120 min, the solid-liquid suspension slurry was transferred to the precipitation separation cell, to quickly obtain solid products using pressurized filtration, and then the solid products were fed into the cyclone drying apparatus to quickly dry to obtain micron-sized calcium carbonate-rich fibers. X-ray diffraction analysis and scanning electron microscopy were used to determine the proportion and morphological characteristics of calcium carbonate microfibers (FIG. 2B), and main indexes of which are shown in Table 1. Then the calcium carbonate microfibers were fed into a blender at 5% wt/wt and mixed with 78.5% wt/wt cement clinker, 1.5% wt/wt gypsum, and 15% wt/wt limestone powder to prepare microfiber-reinforced cement. The $CO_2$ storage capacity of the microfiber-reinforced cement was calculated to be 0.52 g $CO_2$/g cement clinker. The prepared microfiber-reinforced cement had a reduction in $CO_2$ emission by 23.9%, an increase in compressive strength by 16.2%, an increase in flexural strength by 15.3%, a reduction in drying shrinkage by 34.5%, an increase in tensile strength by 15.6%, and an increase in toughness by 18.0%, after calculation with the whole life cycle carbon footprint and test according to the methods of the national standards GB/T 17671-2020, GBT29417-2012, GB/T50081-2002 and ACI 544-2R-89, as compared to PI 52.5 common silicate cement produced by Green Island Cement Co., Ltd. in Hong Kong.

Example 3

First, the cement clinker was ground into powder (<0.075 mm) to a specific surface area of 395 m²/kg and mixed thoroughly with an aqueous solution in a carbonation reaction cell at a solid-to-liquid mass ratio of 1:100. The solution used was composed of 0.01% mass fraction of the reaction accelerator polyvinyl alcohol and 0.05 mol/L of the surfactant magnesium phosphate. After stirring, the suspension slurry was heated to 45° C., then the cement kiln flue gas cooled by the waste heat generation system was introduced into the suspension slurry, wherein the concentration of carbon dioxide in the flue gas was 25% VOL of the total flue gas, the rate for introduction was controlled to be 0.8 L $CO_2$/min/g, as calculated according to the pure carbon dioxide, the pressure was controlled to be 0 atmospheres pressure. After carbonation for 30 min, the suspension slurry was transferred to the precipitation separation cell, to quickly obtain solid products using the centrifugal method, and then the solid products were fed into the cyclone drying apparatus for quick drying to obtain micron-sized calcium carbonate-rich fibers. The X-ray diffraction analysis and scanning electron microscopy were used to determine the proportion and morphological characteristics of calcium carbonate microfibers (FIG. 2C), the main indexes of which are shown in Table 1. Then the calcium carbonate microfibers were fed into a blender at 20% wt/wt and mixed with 68% wt/wt cement clinker, 2% wt/wt gypsum and 10% wt/wt mineral powder to prepare microfiber-reinforced cement. The $CO_2$ storage capacity of the microfiber-reinforced cement was calculated to be 0.43 g $CO_2$/g clinker. The prepared microfiber-reinforced cement shows a reduction in $CO_2$ emission by 42.7%, an increase in 28d compressive strength by 10.2%, an increase in 28d flexural strength by 13.5%, a reduction in drying shrinkage by 56.6%, an increase in tensile strength by 21.7%, and an increase in toughness by 22.0%, after calculation with the whole life cycle carbon footprint and test according to the methods of the national standards GB/T 17671-2020, GBT29417-2012, GB/T50081-2002 and ACI 544-2R-89, as compared to PI 52.5 common silicate cement produced by Green Island Cement Co., Ltd. in Hong Kong.

TABLE 1

Performance indexes of calcium carbonate microfibers and microfiber-reinforced cement obtained in Examples 1-3.

| Index | Example 1 | Example 2 | Example 3 |
| --- | --- | --- | --- |
| Specific area of the microfiber ($m^2$/kg) | 765.7 | 859.3 | 635.6 |
| length-diameter ratio of the microfiber | 10-30 | 10-20 | 5-15 |
| initial setting time of microfiber-reinforced cement (min) | 110 | 135 | 95 |
| final setting time of microfiber-reinforced cement (min) | 150 | 190 | 135 |
| compressive strength of microfiber-reinforced cement 28 d (MPa) | 57.2 | 57.8 | 54.8 |
| flexural strength of microfiber-reinforced cement 28 d (MPa) | 10.4 | 9.8 | 9.6 |

What is claimed is:

1. A method for sequestrating carbon dioxide from a flue gas, the method comprising: reacting the flue gas with a cement clinker thereby sequestering at least a portion of the carbon dioxide from the flue gas in the cement clinker, wherein the flue gas comprises decomposition furnace flue gas, rotary kiln flue gas, cyclone preheater flue gas, or oxy-fuel combustion flue gas.

2. The method of claim 1, wherein the cement clinker is in the form of a powder.

3. The method of claim 1, wherein the step of reacting the flue gas and the cement clinker takes place in the presence of at least one of a reaction accelerator and a surfactant.

4. The method of claim 3, further comprising the step of mixing the reaction accelerator, the surfactant, and the cement clinker in water thereby forming a solid-liquid suspension slurry.

5. The method of claim 1 further comprising the step of carrying out solid-liquid separation after the reaction between the flue gas and the solid-liquid suspension slurry thereby forming a solid and a liquid.

6. The method of claim 5 further comprising the step of drying the solid to obtain a separated fibrous solid comprising calcium carbonate microfibers.

7. The method of claim 3, wherein the reaction accelerator comprises sodium ethylenediamine tetraacetate, polyvinyl alcohol, triethanolamine, or any combination thereof.

8. The method of claim 3, wherein the surfactant comprises sodium carboxymethyl cellulose, amino acid phosphate, soluble magnesium salt, magnesium hydroxide, phosphoric acid, soluble phosphate, soluble aluminum salt, or any combination thereof.

9. The method of claim 1, wherein the cement clinker is a Portland cement clinker.

10. The method of claim 1, wherein the cement clinker comprises $Ca_3SiO_5$, $Ca_2SiO_4$, $Ca_3Al_2O_6$, and $Ca_4Al_2Fe_2O_{10}$.

11. The method of claim 3, wherein the powder has at least one of an average particle size of less than 0.075 mm, or has a specific surface area of at least 200 $m^2$/kg.

12. The method of claim 1, wherein the solid-liquid suspension slurry is prepared by mixing the cement clinker with an aqueous solution comprising the reaction accelerator and the surfactant.

13. The method of claim 4, wherein the mass ratio of the cement clinker to the water in the solid-liquid suspension slurry is from 1:5 to 1:100.

14. The method of claim 1, wherein the solid-liquid suspension slurry is at least one of heated to 45° C.-100° C. and exposed to a pressure of to 0-2 atmosphere.

15. The method of claim 1, wherein the concentration of carbon dioxide in the flue gas is at least 5%; and the concentrations of $NO_x$ and $SO_2$ are optionally not higher than 400 mg/$m^3$ and 200 mg/$m^3$, respectively.

16. A method for preparing a microfiber-reinforced cement, comprising mixing the separated fibrous solid of claim 6 with gypsum and a mineral admixture comprising one or more of silica fume, fly ash, slag, metakaolin, and ground limestone powder.

17. A microfiber-reinforced cement prepared according to the method of claim 16.

18. The microfiber-reinforced cement of claim 17, wherein the microfiber-reinforced cement comprises the separated fibrous solid in an amount of 2-20% by weight of the microfiber-reinforced cement, the cement clinker in an amount of 50-90% by weight of the microfiber-reinforced cement, the gypsum in an amount of 1-3% by weight of the microfiber-reinforced cement, and the mineral admixture in an amount of 5-40% by weight of the microfiber-reinforced cement.

* * * * *